LITHOGRAPHIC APPARATUS

Filed Feb. 19, 1970

INVENTOR.
Frank J. Radencic
BY Schmidt, Johnson, Hovey, Williams & Chale
ATTORNEYS.

United States Patent Office 3,621,582
Patented Nov. 23, 1971

3,621,582
LITHOGRAPHIC APPARATUS

Frank J. Radencic, 7932 Haskell,
Kansas City, Kans. 66109

Filed Feb. 19, 1970, Ser. No. 12,699
Int. Cl. B41b *1/00*
U.S. Cl. 33—184.5 9 Claims

ABSTRACT OF THE DISCLOSURE

Photolithographic apparatus for treating a photosensitive surface by the successive imposition upon different predetermined spaced portions of the surface of identical photoimpressions of an image created by the passage of light through an image-forming negative or positive comprises a guide panel for supporting the surface, a transparent carrier member and a frame-like chase which supports the negative or positive. Hence, the negative or positive is positionable relative to the photosensitive surface in either of two perpendicular directions by fractional increments of corresponding perpendicular dimensions of the negative or positive without the need for remounting or repositioning of the latter relative to the chase.

This invention relates generally to equipment for use in processing photosensitive materials and, more particularly, to apparatus for treating a photosensitive surface by the successive imposition, upon different predetermined spaced portions of the surface offset from each other in either or both of a pair of perpendicular directions, of identical photoimpressions of an image presented by the passage of light through a single image-forming negative or positive.

In photolithography, it is often desirable to make a plurality of spaced identical photoimpressions upon a chemically treated photosensitive surface of a metallic plate using a single negative or positive. Such work requires the negative or positive to be aligned and positioned relative to the photosensitive surface with great accuracy. A significant advancement in the art from the standpoint of both speed and accuracy is represented by my prior Patent No. 2,825,976, entitled "Repeat Apparatus for Holding Negatives Used in Lithography," and which issued Mar. 11, 1958. While the apparatus described in the aforementioned patent permits positioning and repositioning of a negative or positive relative to the photosensitive surface in one perpendicular direction without the need for individual alignment at each position, it has been necessary to remount the negative or positive relative to the chase upon which it is carried when a different area of the photosensitive surface, parallel to but spaced from the first exposed area, is desired to be exposed. Furthermore, advancements in the art of photolithography have created a need for apparatus capable of positioning the negative or positive at locations spaced from each other a distance equal to a smaller fractional increment of the dimensions of the negative or positive than can be accomplished with the apparatus described in the aforementioned patent.

It is, therefore, the primary object of the present invention to provide photolithographic apparatus for treating a photosensitive surface by the successive imposition, upon different predetermined spaced portions of the surface of identical photoimpressions of an image created by the passage of light through an image-forming negative or positive whereby the negative or positive may be mounted no a frame-like chase and moved relative to the photosensitive surface in either of two perpendicular directions without the need for remounting of the negative or positive relative to the chase.

A further object of the invention is to provide photolithographic apparatus as described in the foregoing object wherein the same apparatus can be utilized for positioning negatives or positives of different sizes at predetermined spaced intervals along a photosensitive surface without major adjustment of the apparatus for the particular size negative or positive being used.

Additionally, an object of the invention is to provide photolithographic apparatus as set forth in the preceding objects wherein the spacing between successive identical images can be varied over a range of any multiple of one-thirty-second of an inch.

A still further object of the invention is to provide photolithographic apparatus for treating a photosensitive surface wherein positioning of a negative or positive relative to the surface is accomplished by a carrier member and a negative-supporting chase, both of which are movable relative to a guide panel in opposed perpendicular directions, the guide panel supporting the photosensitive surface.

Yet another object of the invention is to provide photolithographic apparatus as described in the foregoing object wherein the carrier member is transparent to permit the passage of light therethrough regardless of the position of the positive or negative-supporting chase relative thereto.

Other objects of the invention, including important details of construction, will be made clear or become apparent as the following description of an illustrative embodiment of the invention proceeds.

Figure 1:
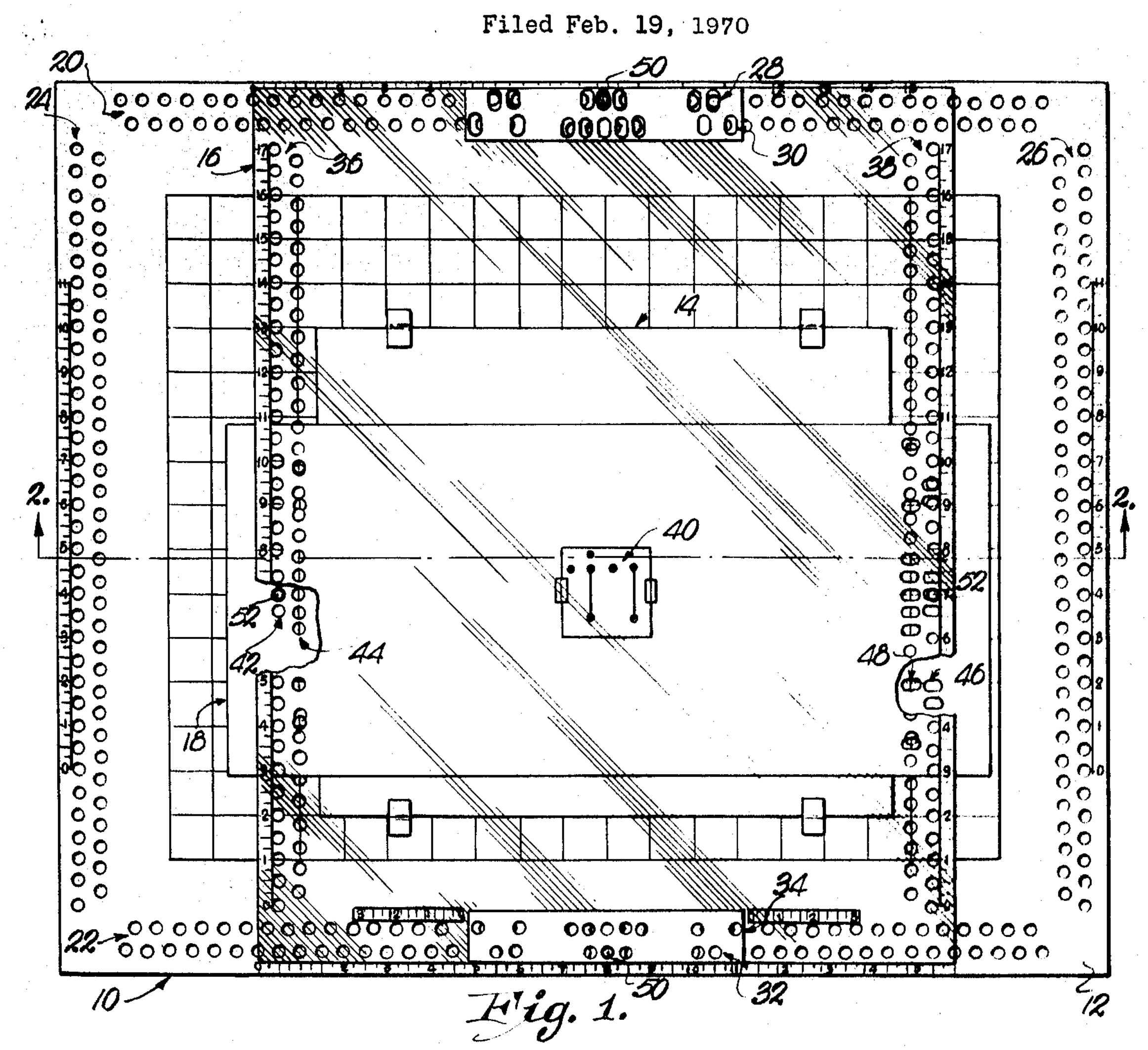
FIG. 1 is a top plan view of the apparatus of the invention illustrating its use in positioning an image-forming negative relative to a photosensitive surface.

Referring now to FIG. 1, it is seen that the apparatus 10 includes a guide panel 12 which supports a photosensitive surface 14, a generally transparent carrier member 16, and a frame-like chase 18 which is sandwiched between the underside of the member 16 and the photosensitive surface 14. The guide panel 12 is preferably a relatively thin sheet of inflexible material such as aluminum. The guide panel 12 has a first pair of elongated series of perforations 20 and 22 at opposite extremities thereof, and a second pair of elongated series of perforations 24 and 26 adjacent the other two extremities. Each of the elongated series of perforations 20, 22, 24 and 26 comprises first and second spaced rows of perforations with the perforations in one row being offset longitudinally of the row relative to the perforations in the other row. The perforations in each row have their centers spaced apart a predetermined distance which is preferably one-half inch, and the perforations in one of the rows of each pair have their centers offset longitudinally of the row relative to the centers of the perforations in the other row a distance equal to one-half of the aforementioned predetermined distance.

The carrier member 16 comprises a sheet of generally transparent material which presents a light-transmitting zone extending over the entire photosensitive surface 14 and has first, second, third and fourth rows of apertures 28, 30, 32 and 34 respectively. The first and second rows of apertures 28 and 30 are spaced apart a distance equal to the spacing between the first and second rows of perforations in the elongated series 20, and the rows of apertures 32 and 34 are spaced apart a distance equal to the spacing between the first and second rows of perforations in the elongated series 22.

It is also to be noted that the apertures within the first row 28 are spaced apart the same distance as the apertures within the third row 32 and the apertures within the second row 30 are spaced apart the same distance as the apertures within the fourth row 34. The spacing between the apertures within the two rows 28 and 30 and within the two rows 32 and 34 is selected to permit positioning of the member 16 relative to the panel 12 at any one of a plurality of locations separated from each other by any multiple of one-sixteenth of the aforementioned predetermined distance between the centers of the perforations in the respective rows of the elongated series 20 and 22. The carrier member 16 also has a pair of spaced, elongated series of openings 36 and 38 therethrough disposed perpendicular to the elongated series of perforations 20 and 22. Each of the elongated series of openings 36 and 38 comprises first and second spaced, parallel rows of openings, the openings within each row being equally spaced from each other a distance representing a fractional increment of that dimension of the image to be formed on the photosensitive sheet which is normal to the first-mentioned dimension. The openings in one of the rows of each series 36 and 38 have their centers spaced apart a predetermined distance which is preferably one-half inch and which equals the fractional increment, and the openings in the other row have their centers offset longitudinally of the row relative to the centers of the openings in the first-mentioned row a distance equal to one-half of the aforementioned predetermined distance.

The chase 18 comprises a sheet of opaque material, a section of which is removed to present a light-transmitting area, and an image-forming photonegative 40 is secured to the chase 18 in alignment with the light-transmitting area. The chase 18 is also provided with first, second, third and fourth rows of holes 42, 44, 46 and 48 respectively. The first and second rows of holes 42 and 44 are spaced from each other a distance equal to the spacing between the first and second rows of openings in the elongated series 36, and the third and fourth rows of holes 46 and 48 are spaced apart a distance equal to the spacing between the first and second rows of openings in the elongated series 38. The spacing between the holes within the two rows 42 and 44 and within the two rows 46 and 48 is selected to permit positioning of the chase 18 relative to the member 16 at any one of a plurality of locations separated from each other by any multiple of one-sixteenth of the aforementioned predetermined distance between the centers of the openings in the respective rows of the elongated series 36 and 38. It is also to be noted that the holes within the first row 42 are spaced apart the same distance as the holes within the third row 46, while the holes within the row 44 are spaced apart the same distance as the holes within the row 48.

It will be seen that one of the apertures in the row 28 is in alignment with one of the perforations in one row of the elongated series of perforations 20 and a corresponding aperture in the third row 32 is in alignment with a corresponding perforation in the corresponding row of the elongated series 22. A first pair of positioning pins 50 are removably disposed within each aligned aperture and perforation for holding the member 16 in position relative to the guide panel 12. Similarly, one of the openings in one of the rows of the elongated series 36 is in alignment with a hole in the first row 42, and a corresponding opening in the corresponding row of the elongated series 38 is in alignment with a corresponding hole in the third row 46. A second pair of positioning pins 52 are removably disposed within each aligned hole and opening for positioning the chase 18 relative to the member 16.

Figures 2, 3:
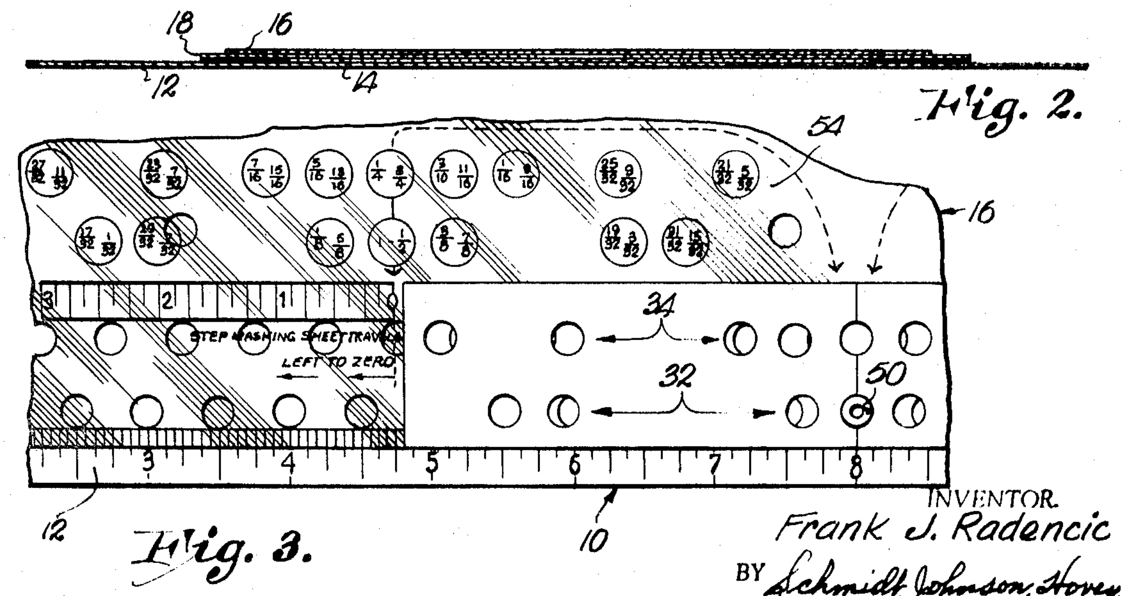
FIG. 2 is a cross-sectional view of the apparatus taken along line 2—2 of FIG. 1.
FIG. 3 is an enlarged fragmentary view of the guide panel and carrier member of the apparatus illustrating the means for positioning the latter relative to the former in increments of $\frac{1}{32}$ of an inch.

With the photosensitive surface 14 secured to the guide panel 12 as illustrated in FIG. 1, and the chase 18 and the carrier member 16 disposed in stacked relationship as illustrated in FIG. 2, a lithographer is ready to expose the entire surface 14 with only a single mounting of the negative 40 on the chase 18. It will be appreciated that any one of the apertures in the first and second rows of apertures 28 and 30 is selectively alignable with any perforation in the corresponding row of the elongated series of perforations 20.

Similarly, a corresponding aperture in one of the third and fourth rows of apertures 32 and 34 is simultaneously alignable with a corresponding perforation in the corresponding row of the other elongated series of perforations 22. Thus, while FIG. 1 illustrates the center aperture in the row 28 aligned with a general centrally disposed perforation in the outermost row of the series 20, numerous other choices could have been made. Likewise, it will be appreciated that any one of the holes in the first and second rows of holes 42 and 44 is selectively alignable with any opening in the corresponding row of openings of the elongated series 36, and a corresponding hole in one of the third and fourth rows of holes 46 and 48 is simultaneously alignable with a corresponding opening in the corresponding row of the elongated series of openings 38. Hence, while the position of pins 52 have been illustrated disposed in the hole which is centrally located relative to the row 42, the chase 18 could be positioned relative to the member 16 with various other holes in alignment with one of the openings in each of the series of openings 36 and 38.

Assuming however, that it is desirable to first move the negative 40 relative to the surface 14, to the left of the location illustrated in FIG. 1, that the negative 40 has a transverse dimension of $^{26}/_{32}$ of an inch from left to right, and further that it is desirable to separate the successive images formed by the passage of light through the negative 40 by increments of $^{1}/_{32}$ of an inch, it will be necessary to move the member 16 relative to the surface 14 a distance of $^{27}/_{32}$ of an inch. A positioning chart generally designated 54 is provided on the front face of the member 16 and is illustrated in detail in FIG. 3. With the positioning pin 50 disposed within the aperture in the row 32 as illustrated in FIG. 3, this aperture becomes the zero or reference point as illustrated by the broken line which passes through the reference circles having the fractions ¼–¾, and 1½ therein. The reference chart is consulted to determine which of the apertures in the rows 32 and 34 must be brought into alignment with a corresponding perforation in the series 22 to effect movement of the member 16 relative to the surface 14 by a distance of $^{27}/_{32}$ of an inch. From FIG. 3 it is seen that the fourth reference circle to the left of the zero reference point and in the uppermost row of reference numerals contains the fraction $^{27}/_{32}$, thus indicating that it is the fourth aperture to the left of the zero or reference aperture in row 34 which must be aligned with a corresponding perforation to effect movement of the member 16 by $^{27}/_{32}$ of an inch.

The reference circle which contains the fraction $^{27}/_{32}$ also contains the fraction $^{11}/_{32}$, thus indicating that the fourth aperture to the left of the zero aperture in row 34 is to be moved past the first perforation in the innermost row of the series 22 with which it comes into alignment and on to the second successive perforation in the innermost row of the series 22 with which it comes into alignment. It is to be understood, of course, that a corresponding perforation in the row 30 is moved into alignment with one of the perforations in the innermost row of the series 20 to complete the positioning of the negative 40 at a location spaced to the left of the position shown in FIG. 1 by $^{1}/_{32}$ of an inch. This positioning process can be repeated any number of times until that portion of the surface 14 represented by an area from left to right in FIG. 1 having a width equal to the width of the negative 40 is completely exposed. It is, of course, to be understood that during the actual exposure to a light source (not shown), the remaining area of the surface 14 is masked by any suitable means such as opaque paper (not shown).

Next, it is normally desirable to expose a second portion of the surface 14 which is spaced upwardly in FIG. 1 from the first portion and extends transversely across the surface parallel to the first portion. The chase 18 is normally provided with a positioning chart (not shown) of the same type as the chart 54 and the positioning pins 52 are moved into the properly aligned holes and openings indicated by the chart as being correct for the degree of movement of the chase 18 relative to the member 16 as desired.

Thus, from the foregoing description it is apparent that the negative 40 can be positioned and repositioned in alignment with any predetermined spaced portions of the surface 14 offset from each other in either or both of a pair of perpendicular directions without shifting or remounting of the negative 40 relative to the chase 18. As is apparent from the positioning chart 54, each successive image may be spaced from the previous image by any multiple of one-thirty-second of an inch in either of two directions which are perpendicular to each other. It will also be appreciated that by alternately moving the member 16 relative to the panel 12 and then the chase 18 relative to the member 16, the negative 40 can be moved across the surface 14 along a diagonal path at any one of a plurality of locations spaced from each other. The elongated series of perforations 24 and 26 are available in the event it is desired to move the member 16 relative to the panel 12 in a direction perpendicular to the elongated series of perforations 20 and 22. The negative 40 could, of course, be replaced by an appropriate photopositive although the negative is preferred in most applications. While the apparatus 10 completely eliminates the need for remounting of the negative or positive relative to the chase 18 between portions of the photosensitive surface spaced from each other in either or both of a pair of perpendicular directions, it will be appreciated that another advantage of having apparatus which is capable of moving the negative or positive in increments of only $\frac{1}{32}$ of an inch is that negatives and positives of varying sizes can be accommodated by simply varying the size of the light-transmitting area of the chase 18.

Many minor changes and modifications could manifestly be made from the exact details of the structure disclosed for purposes of illustration without departing from the true spirit of the invention. Accordingly, it is to be understood that the invention should be deemed limited only by the scope of the appended claims.

Having thus described the invention, what is claimed as new and desired to be secured by Letters Patent is:

1. In photolithographic apparatus for treating a photosensitive surface by the successive imposition, upon different predetermined spaced portions of said surface offset from each other in either or both of a pair of perpendicular directions, of identical photoimpressions of an image created by the passage of light through a single image-forming negative or positive, the combination of:

a guide panel adapted to support said surface and having a pair of spaced elongated series of perforations therethrough adjacent opposite extremities thereof, said perforations in each series thereof being equally spaced from each other a distance representing a fractional increment of one dimension of said image-forming negative or positive;

a carrier member spanning the distance between said spaced series of perforations, said member having a light-transmitting zone therein, said member having a pair of apertures therein spaced apart a distance equal to the distance between said spaced series of perforations, said member having a pair of spaced elongated series of openings therethrough disposed perpendicular to said series of perforations, said openings in each series thereof being equally spaced from each other a distance representing a fractional increment of that dimension of said image-forming negative or positive which is normal to the first-mentioned dimension, one of said apertures being selectively alignable with any perforation in one of said series of perforations and the other of said apertures being simultaneously alignable with a corresonding perforation in the other of said series of perforations, first means removably disposed within each aligned aperture and perforation for holding said member in any selected position relative to said panel;

a frame-like chase spanning the distance between said spaced series of openings, said chase being adapted to be provided with a light-transmitting area therein and carrying said image-forming negative or positive thereon in alignment with said area, said chase having a pair of spaced holes therethrough, one of said holes being selectively alignable with any opening in one of said elongated series of openings and the other of said holes being simultaneously alignable with a corresponding opening in the other of said elongated series of openings; and second means removably disposed within each aligned hole and opening for holding said chase in any selected position relative to said member, whereby a negative or positive of any of various sizes carried by said chase may be positioned and repositioned in alignment with any of said portions of said surface without shifting or remounting of the negative or positive relative to the chase.

2. Apparatus as set forth in claim 1, wherein each of said elongated series of perforations comprises first and second spaced rows of perforations, the perforations in each row having their centers spaced apart a predetermined distance, and the perforations in the first row having their centers offset longitudinally of the row relative to the centers of the perforations in the second row a distance equal to one-half of said predetermined distance, whereby said carrier member is positionable relative to said panel in any one of a plurality of locations separated by one-half of said predetermined distance.

3. Apparatus as set forth in claim 2, wherein is included a first row of apertures in alignment with one of said pair of apertures, a second row of apertures spaced from said first row of apertures a distance equal to the spacing between the first and second rows of perforations in one of said series of perforations, a third row of apertures in alignment with the other of said pair of apertures, and a fourth row of apertures spaced from the third row of apertures a distance equal to the spacing between the first and second rows of perforations in the other of said series of perforations, said apertures in the first row being spaced apart the same distance as the apertures in the third of said rows and said apertures in the second row being spaced apart the same distance as the apertures in the fourth of said rows, any one of said apertures in said first and second rows of apertures being selectively alignable with any perforation in the corresponding row of one of said elongated series of perforations and a corresponding aperture in one of said third and fourth rows of apertures being simultaneously alignable with a corresponding perforation in the corresponding row of the other of said elongated series of perforations, the spacing between said apertures within each row thereof being selected to permit positioning of said member relative to said guide panel at any one of a plurality of locations separated from each other by any multiple of one-sixteeth of said predetermined distance.

4. Apparatus as set forth in claim 1, wherein each of said elongated series of openings comprises first and second spaced rows of openings, the openings in each row having their centers spaced apart a predetermined distance, and the openings in the first row having their centers offset longitudinally of the row relative to the centers of the openings in the second row a distance equal to one-half of said predetermined distance, whereby said chase is positionable relative to said member in any one of a plurality of locations separated by one-half of said predetermined distance.

5. Apparatus as set forth in claim 4, wherein is included a first row of holes in alignment with one of said pair of holes, a second row of holes spaced from said first row of holes a distance equal to the spacing between the first and second rows of openings in one of said series of openings, a third row of holes in alignment with the other of said pair of holes, and a fourth row of holes spaced from said second row of holes a distance equal to the spacing between the first and second rows of openings in the other of said series of openings, said holes in the first row being spaced apart the same distance as the holes in the third of said rows and said holes in the second row being spaced apart the same distance as the holes in the fourth of said rows, any one of said holes in said first and second rows of holes being selectively alignable with any opening in the corresponding row of one of said elongated series of openings and a corresponding hole in one of said third and fourth rows of holes being simultaneously alignable with a corresponding opening in the corresponding row of the other of said elongated series of openings, the spacing between said holes within each row thereof being selected to permit positioning of said chase relative to said member at any one of a plurality of locations separated from each other by any multiple of one-sixteenth of said predetermined distance.

6. Apparatus as set forth in claim 1, wherein said member comprises a sheet of generally transparent material.

7. Apparatus as set forth in claim 1, wherein said chase comprises a sheet of opaque material with a section thereof being removable to present said light-transmitting area.

8. In photolithographic apparatus for treating a photosensitive surface by the successive imposition, upon different predetermined spaced portions of said surface offset from each other in either or both of a pair of perpendicular directions, of identical photoimpressions of an image created by the passage of light through a single image-forming negative or positive, the combination of:

a guide panel adapted to support said surface and having a pair of spaced, elongated series of perforations therethrough adjacent opposite extremities thereof,
each of said series of perforations comprising first and second spaced rows of perforations, the perforations in one row being offset longitudinally of the row relative to the perforations in the other row,
said perforations in each row being equally spaced from each other a distance representing a fractional increment of one dimension of said image-forming negative or positive,
a carrier member comprising a sheet of generally transparent material and spanning the distance between said spaced series of perforations,
said member having a pair of apertures therein spaced apart a distance equal to the distance between said spaced series of perforations,
said member having a pair of spaced, elongated series of openings therethrough disposed perpendicular to said series of perforations,
each of said series of openings comprising first and second spaced rows of openings, the openings in one row being offset longitudinally of the row relative to the openings in the other row,
said openings in each row being spaced from each other a distance representing a fractional increment of that dimension of said image-forming negative or positive which is normal to said first-mentioned dimension,
one of said apertures being selectively alignable with any perforation in one of said series of perforations and the other of said apertures being simultaneously alignable with a corresponding perforation in the other of said series of perforations;
first means removably disposed within each aligned aperture and perforation for holding said member in any selected position relative to said panel;
a frame-like chase of opaque material spanning the distance between said spaced series of openings,
a section of said chase being removable to present a light-transmitting area therein,
said chase carrying said image-forming negative or positive thereon in alignment with said area,
said chase having a pair of spaced holes therethrough,
one of said holes being selectively alignable with any opening in one of said elongated series of openings and the other of said holes being simultaneously alignable with a corresponding opening in the other of said elongated series of openings; and
second means removably disposed within each aligned hole and opening for holding said chase in any selected position relative to said member,
whereby a negative or positive of any of various sizes carried by said chase may be positioned and repositioned in alignment with any of said portions of said surface without shifting or remounting of the negative or positive relative to the chase.

9. In photolithographic apparatus for treating a photosensitive surface by the successive imposition, upon different predetermined spaced portions of said surface, of identical photoimpressions of an image created by the passage of light through a single image-forming negative or positive, the combination of:

a guide panel for supporting said surface and having a pair of spaced, elongated series of perforations therethrough adjacent opposite extremities thereof,
each of said elongated series of perforations comprising first and second spaced rows of perforations,
said perforations in each row having their centers spaced apart a predetermined distance and the perforations in the first row having their centers offset longitudinally of the row relative to the centers of the perforations in the second row a distance equal to one-half of said predetermined distance;
a carrier member spanning the distance between said spaced series of perforations,
said member having a light-transmitting zone therein,
said member having first and second rows of apertures therein spaced from each other a distance equal to the spacing between the first and second rows of perforations in one of said series of perforations,
said member having third and fourth rows of apertures therein spaced from each other a distance equal to the spacing between the first and second rows of perforations in the other of said series of perforations,
said apertures in the first row having spaced apart the same distance as the apertures in said third row and said apertures in the second row being spaced apart the same distance as said apertures in the fourth row,
any one of said apertures in said first and second rows of apertures being selectively alignable with any perforation in corresponding row of perforations, and
a corresponding aperture in one of said third and fourth rows of apertures being simultaneously alignable with a corresponding perforation in the corresponding row of the other of said elongated series of perforations;
means for mounting said image-forming positive or negative on said member;
retainer means removably disposed within each aligned aperture and perforation for holding said member in any selected position relative to said guide panel, the spacing between said apertures within each row thereof being selected to permit positioning of said member relative to said guide panel at any one of a plurality of locations separated from each other by any multiple of one-sixteenth of said predetermined distance, whereby a negative or positive of any of various sizes carried by said member may be positioned and repositioned in alignment with said surface without shifting or remounting of the negative or positive relative to the member.

References Cited

UNITED STATES PATENTS

| | | | |
|---|---|---|---|
| 2,711,031 | 6/1955 | Kessler | 33—184.5 |
| 2,825,976 | 3/1958 | Radencic | 33—184.5 |
| 3,067,666 | 12/1962 | Coffman | 33—184.5 |
| 3,239,940 | 3/1966 | Berkowitz | 33—184.5 |

WILLIAM D. MARTIN, Jr., Primary Examiner

U.S. Cl. X.R.

101—Dig. 12; 355—72